United States Patent [19]

Daugherty

[11] 4,127,788
[45] Nov. 28, 1978

[54] PIEZOELECTRIC STRESS INDICATOR FOR MINE ROOFS

[76] Inventor: Ralph N. Daugherty, Rte. 4, Box 54, Front Royal, Va. 22630

[21] Appl. No.: 814,018

[22] Filed: Jul. 8, 1977

[51] Int. Cl.² .................................... H01L 41/10
[52] U.S. Cl. .................................... 310/328; 310/334; 310/338
[58] Field of Search ............... 310/338, 328, 334, 331; 73/88 R, 88 E, 88 F, 88.5 SD, 88.5 R

[56] References Cited

U.S. PATENT DOCUMENTS

| | | | |
|---|---|---|---|
| 1,495,429 | 5/1924 | Nicolson | 310/338 |
| 2,216,966 | 10/1940 | Swift | 310/338 |
| 2,250,496 | 7/1941 | Postlethwaite | 310/338 |
| 2,558,563 | 6/1951 | Janssen | 310/331 X |
| 2,917,642 | 12/1959 | Wright et al. | 310/338 |
| 3,580,057 | 6/1969 | Seegmiller | 310/328 |
| 3,635,076 | 1/1972 | Sacks et al. | 73/88 E |
| 3,638,053 | 1/1972 | Schenk et al. | 310/338 |
| 3,885,423 | 5/1975 | Schuermann et al. | 73/88 E |
| 4,021,688 | 5/1977 | Kudinov et al. | 310/338 |

*Primary Examiner*—Mark O. Budd
*Attorney, Agent, or Firm*—Nathan Edelberg; Robert P. Gibson; Saul Elbaum

[57] ABSTRACT

A device for detecting deformations in mine roofs wherein an open cylindrical casing having inner and outer threaded surfaces is threaded into the mine roof. A piezoelectric crystal is mounted within the casing to sense the deformations and stresses in the mine roof. Provision is made for mounting a plurality of piezoelectric crystals within the casing whereby stresses at varying locations are sensible.

4 Claims, 3 Drawing Figures

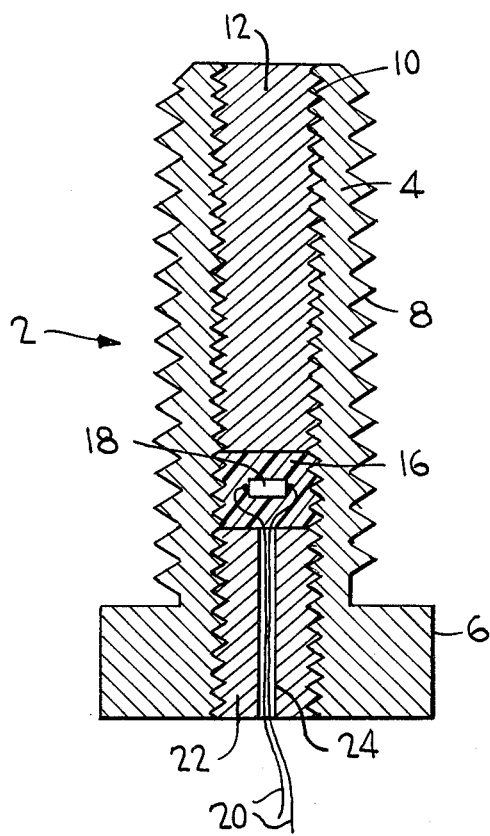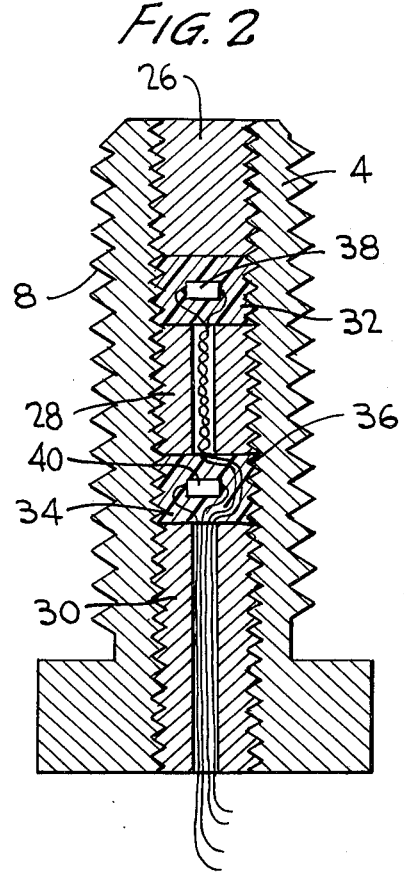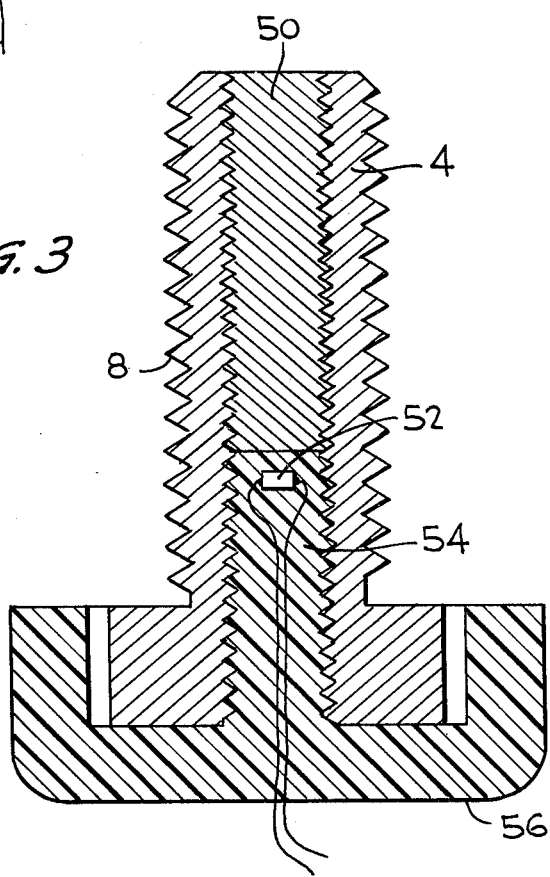

PIEZOELECTRIC STRESS INDICATOR FOR MINE ROOFS

RIGHTS OF THE GOVERNMENT

The invention described herein may be manufactured, used and licensed by or for the United States Government for governmental purposes without the payment to me of any royalty thereon.

BACKGROUND OF INVENTION

This invention relates to a mine roof warning device for signaling the settling of the roof of a mine tunnel or other underground excavation. In underground mining there is constant danger both to the mine workers and the mining machinery, of a shift in the strata above the mine passage tunnel which can eventually result in a cave-in if precautionary measures are not taken. Minor shifts in the mine ceiling indicative of pending disaster are not always noticable to the naked eye of even the experienced mining engineer.

Previous warning devices for mine roofs have been limited in their application because of their size and expense. All the previous devices known either have required an external power source which added to the fire hazard in the mine or have required periodic inspection by trained personnel.

SUMMARY OF THE INVENTION

The present invention provides a means for detecting changes in stress levels in mine roofs which takes advantage of the current technique used in the coal mine industry of using bolts to "pin" the mine roof. A detector is formed from a piezoelectric crystal housed in a bolt structure. The detector will produce an electrical output when changes in stress are encountered by the bolt structure. The detector can then be installed in the same manner as the "pin" bolts, requiring no additional machinery for installation. In operation the piezoelectric crystal will produce an output when stress is applied and no additional power source is needed. Because the detector of the present invention can be operated without an external power source it is inherently safer then these detectors requiring power sources in the explosive atmosphere of a mine.

BRIEF DESCRIPTION OF THE DRAWINGS

FIG. 1 is a sectional view of a stress indicator in accordance with the invention.

FIG. 2 is a view similar to FIG. 1 showing a variation of the indicator in accordance with the invention.

FIG. 3 is a sectional view similar to FIG. 1 showing a further variation of the device.

DESCRIPTION OF THE PREFERRED EMBODIMENTS

As shown in FIG. 1, a preferred sensor in accordance with the invention is designated at 2. The main body or casing 4 of the device is in the form of a bolt having a head 6 and threads 8. Casing 4 surrounds a threaded bore 10. Mounted in casing 4 between spacers 12 and 22 is an epoxy resin block 16 in which a piezoelectric crystal 18 is embedded. Spacer 22 is provided with a bore 24 to allow passage of electrical leads 20 from piezoelectric crystal 18, though experience may show that no spacers are required.

In operation sensor 2 would be installed in a mine roof along with "pin" bolts to secure dangerous rock strata, e.g. slate, to more firm strata. Electrical leads 20 would then be connected to a suitable alarm or recording device, not required as part of this invention. Any significant change in the level of stress applied to sensor 2, such as those caused by a shifting of the pinned strata, would act through casing 4 and block 16 to change the level of stress on piezoelectric crystal 18. An electrical signal would then be produced by crystal 18 and transmitted to the alarm or recording device.

FIG. 2 shows a modification of the device housing two piezoelectric crystals 38 and 40. By choosing spacers 26, 28 and 30 of appropriate lengths crystals 38 and 40 can be located at whatever position is desired. For example, the crystals could be located to correspond to the separation lines between different strata. Block 34 in which crystal 40 is embedded is provided with a passageway 36 to allow passage of the electrical leads from crystal 38.

FIG. 3 shows a modification of the invention arranged to permit installation of the crystal after the casing 4 has been placed in position. By forming epoxy resin block 54 with an integral head 56, crystal 52 can easily be screwed into place after casing 4 has been placed. This arrangement provides an effective seal to further prevent any sparking.

Though the embodiments illustrated in the figures show screw threads 8 for coupling casing 4 to the rock strata, other means could be used. For example, an expansive cement or epoxy could be used. For economy of operation it is desirable that the casing be installed in the same manner as the "pin" bolts used to secure the strata.

Likewise, it is not essential that the spacers and resin block be threadedly engaged with the casing. Use of an epoxy resin to affix the spacers and block to the casing has been demonstrated to work.

Similarly it is not essential that the block in which the piezoelectric crystal is embedded be made of an epoxy resin. Any material capable of being formed around the crystal and rigidly coupling it to the outer casing would be suitable.

I wish it to be understood that I do not desire to be limited to the exact details of construction shown and described, for obvious modifications can be made by a person skilled in the art.

I claim:

1. A device for detecting deformation in rock strata comprising:
    an open cylindrical casing having an inner threaded surface and an outer surface insertable in the strata;
    external screw threads on said outer surface to rigidly couple said outer surface to the strata in which said casing is inserted;
    a piezoelectric crystal stress sensor;
    a block of resinous material in which said sensor is embedded, said block having external threads to rigidly couple said stress sensor to the inner surface of said casing to transmit deformation of said strata to said stress sensing means and to permit said stress sensor to be coupled to said casing after insertion of said casing in said solid; and
    spacer means to axially locate said stress sensor within said casing, said spacer means comprising a solid cylinder threadedly engaged with said inner surface of said casing.

2. The device of claim 1 further comprising a second stress sensor and a second block of resinous material in which said second stress sensor is embedded, said second block having external threads to rigidly couple said second stress sensor to said casing in a position spaced from said first sensor by said spacer means.

3. The device of claim 2 wherein said spacer means includes an axial channel to provide a passage for electrical connections to said stress sensor.

4. The device of claim 1 wherein said block of resinous material further comprises a head portion for covering one end of said casing, said head portion consisting of said resinous material.

* * * * *